(12) United States Patent
Seyama et al.

(10) Patent No.: US 6,251,538 B1
(45) Date of Patent: Jun. 26, 2001

(54) POSITIVE ACTIVE MATERIAL FOR ALKALINE BATTERY AND ELECTRODE USING THE SAME

(75) Inventors: Yukitaka Seyama; Hideki Sasaki; Toshio Murata, all of Kyoto (JP)

(73) Assignees: Japan Storage Battery Co., Ltd.; GS-Melcotec Co., Ltd., both of Kyoto (JP)

( * ) Notice: Subject to any disclaimer, the term of this patent is extended or adjusted under 35 U.S.C. 154(b) by 0 days.

(21) Appl. No.: 09/301,127

(22) Filed: Apr. 28, 1999

(30) Foreign Application Priority Data

Apr. 28, 1998 (JP) .................................. 10-134484
Apr. 7, 1999 (JP) .................................. 11-099986

(51) Int. Cl.⁷ .................................. H01M 4/32
(52) U.S. Cl. ........................ 429/223; 429/218.1
(58) Field of Search ................. 429/223, 218.2

(56) References Cited

U.S. PATENT DOCUMENTS 5,032,475 * 7/1991 Hasebe et al. ................ 429/60
5,861,225 * 1/1999 Corrigan et al. .............. 429/223

FOREIGN PATENT DOCUMENTS 0 353 837 A1   2/1990 (EP) .
11086860   *   3/1999 (JP) ............................ 4/52

OTHER PUBLICATIONS

Patent Abstract of Japan, vol. 1998, No. 08, Publication Date Mar. 17, 1998.
Patent Abstract of Japan, vol. 1999, No. 10, Publication Date May 28, 1999.
Patent Abstract of Japan, vol. 1999, No. 08, Publication Date Mar. 30, 1999.

* cited by examiner

*Primary Examiner*—Gabrielle Brouillette
*Assistant Examiner*—M. Wills
(74) *Attorney, Agent, or Firm*—Sughrue, Mion, Zinn, Macpeak & Seas, PLLC

(57) ABSTRACT

A nickel hydroxide positive active material for an alkaline battery contains nickel hydroxide powder having a nickel valence of greater than 2; and a cobalt compound having a cobalt valence of greater than 2, which is formed on the surface of said nickel hydroxide powder. For example, the surface of nickel oxyhydroxide powder is covered by cobalt oxyhydroxide layer. This positive active material is used as a starting material to produce an electrode by retaining it in a three-dimensional porous material.

4 Claims, 2 Drawing Sheets

POSITIVE ACTIVE MATERIAL FOR ALKALINE BATTERY AND ELECTRODE USING THE SAME

BACKGROUND OF THE INVENTION

1. Field of the Invention

The present invention relates to a nickel hydroxide positive active material for an alkaline battery and a nickel hydroxide electrode using the nickel hydroxide active material.

2. Description of the Related Art

A nickel hydroxide electrode comprising an active material as a compound mainly composed of nickel hydroxide has been used as a positive electrode for an alkaline battery such as a nickel-cadmium storage battery and a nickel-metal hydride storage battery. Such an alkaline storage battery is used as a power supply for small-sized portable electronic devices. In order to improve these electronic devices, alkaline storage batteries having an enhanced capacity have been desired. To this end, it is necessary that the nickel hydroxide electrode, which governs the discharge capacity of alkaline storage battery, have an enhanced high energy density.

As a nickel hydroxide electrode, there has heretofore been often used a sintered electrode. The sintered electrode is prepared by sintering a nickel powder on a porous punching metal to obtain a substrate, and then impregnating the substrate with an nickel hydroxide active material. However, such a sintered nickel hydroxide electrode is disadvantageous in that the substrate exhibits porosity as small as about 80%, and thus can be hardly impregnated with a large amount of an active material. Therefore, such a substrate is unfavorable for the enhancement of the energy density of nickel hydroxide electrode.

On the other hand, a non-sintered nickel hydroxide electrode obtained by retaining a nickel hydroxide active material in a three-dimensional porous metal material such as foamed nickel or fibrous nickel as a substrate exhibits a substrate porosity as high as not less than 95%. Thus, it is favorable for the enhancement of the energy density of nickel hydroxide electrode as compared with the foregoing sintered nickel hydroxide electrode. Under these circumstances, studies of enhancement of capacity of alkaline storage batteries have been made mainly using non-sintered nickel hydroxide electrode.

The non-sintered nickel hydroxide electrode exhibits a low electrical conductivity of nickel hydroxide. Accordingly, it is necessary to incorporate a cobalt compound such as cobalt hydroxide, cobalt monoxide and cobalt suboxide or metallic cobalt as an electrically-conducting agent in the nickel hydroxide electrode or coat the surface of particulate nickel hydroxide with such a cobalt compound or metallic compound as disclosed in JP-A-62-117267 (The term "JP-A" as used herein means an "Unexamined Japanese Patent Publication").

It is thought that the cobalt compound thus added is converted to cobalt oxyhydroxide having a high electrical conductivity by electrochemical oxidation during the first charging for formation. Then, it forms an electrically conductive network in the electrode to function as an effective electrically conducting agent in the nickel hydroxide electrode. The coating of the surface of particulate nickel hydroxide makes it possible to raise the area of contact of the cobalt compound with nickel hydroxide and hence add to the effect of enhancing the percent utilization of active material as compared with the single addition of the cobalt compound.

Nickel hydroxide, which acts as an active material for nickel hydroxide electrode in alkaline storage batteries, is oxidized during charging to form nickel oxyhydroxide. Further, it is reduced to nickel hydroxide during discharging. Nickel hydroxide is a material having a lower electrical conductivity than nickel oxyhydroxide. Thus, nickel hydroxide is disadvantageous in that it causes a drop of charge efficiency at the initial stage of charging, particularly during the first charging for formation.

In order to solve these problems, an approach has been proposed involving the uniform addition of nickel oxyhydroxide, which is a material having a higher electrical conductivity than nickel hydroxide, to a nickel hydroxide electrode material before the preparation of a nickel hydroxide electrode as described in JP-A-2-262245 and JP-A-2-234356.

However, it was found that the addition of nickel oxyhydroxide to a nickel hydroxide electrode having the conventional cobalt compound having a cobalt valence of 2 or less such as cobalt hydroxide and cobalt monoxide or metallic cobalt incorporated therein gives a smaller discharge capacity than calculated.

SUMMARY OF THE INVENTION

It is an object of the present invention to provide an improved nickel hydroxide active material for an alkaline battery and a nickel hydroxide electrode using the improved nickel hydroxide active material.

The inventors made studies of the reason for the above phenomenon. As a result, it was concluded that the cobalt compound having a cobalt valence of not more than 2, even if it partly has a cobalt valence of greater than 2 but lower than the valence of nickel hydroxide having a valence of greater than 2, partly undergoes oxidation by nickel oxyhydroxide, which has a high oxidizing powder, to form a high order cobalt compound that causes the maldistribution of cobalt compound in the nickel hydroxide electrode, making it impossible to sufficiently form a network of electrical conductivity of cobalt oxyhydroxide, which is considered required to maintain the electrical conductivity of the nickel hydroxide electrode. It was found on the basis of this conclusion that the previous formation of cobalt oxyhydroxide on the surface of particulate nickel hydroxide gives solution to the foregoing problems. The inventors further found a method for enhancing the discharge capacity of alkaline battery in the course of their studies.

According to the present invention, a nickel hydroxide positive active material for an alkaline battery comprises: nickel hydroxide powder having a nickel valence of greater than 2; and a cobalt compound having a cobalt valence of greater than 2, which is formed on the surface of said nickel hydroxide powder.

According to the present invention, an electrode is composed of a three-dimensional porous material retaining the above nickel hydroxide positive active material therein.

In accordance with the present invention, the percent utilization of active material in the nickel hydroxide electrode can be enhanced, making it possible to provide the alkaline battery with an enhanced capacity.

DETAILED DESCRIPTION OF THE INVENTION

Figure 1:
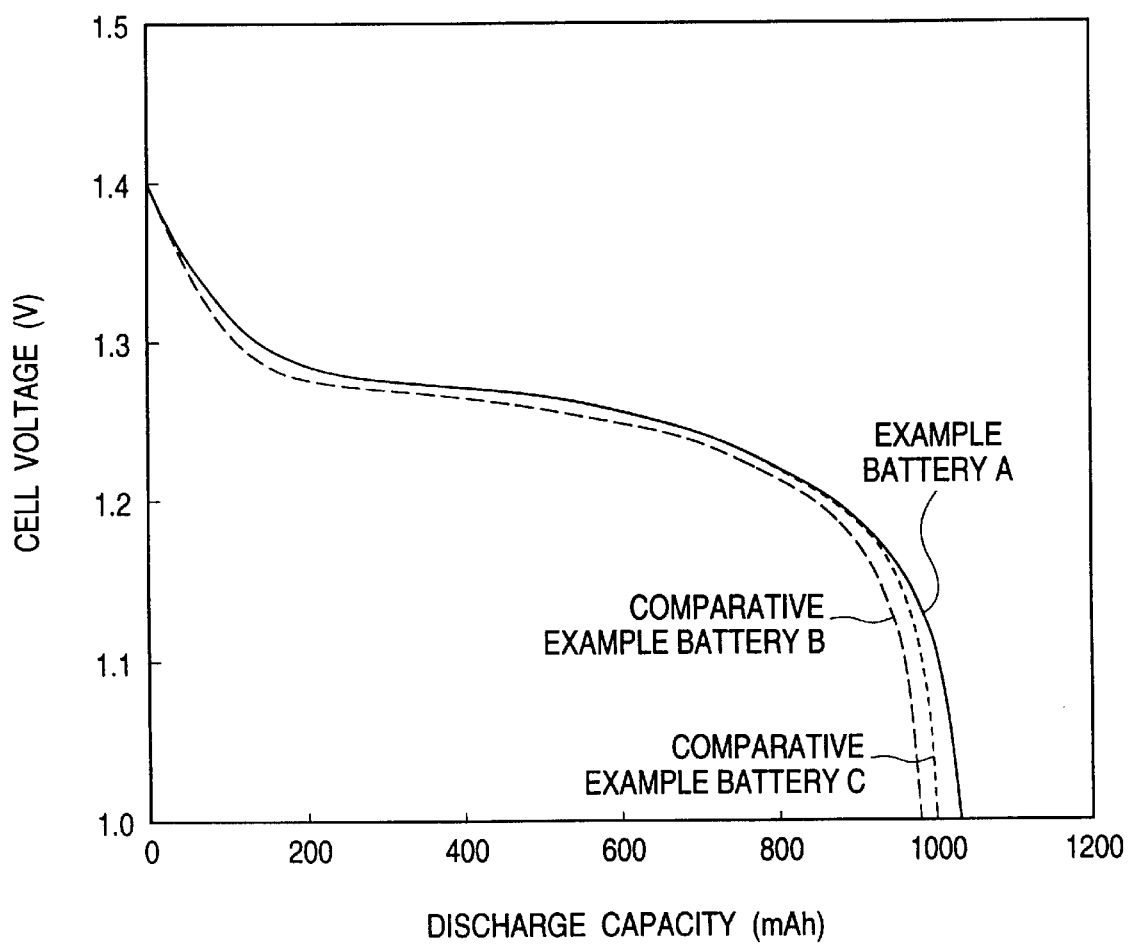
FIG. 1 is a graph illustrating the discharge characteristics of an embodiment of the nickel-cadmium battery according to the present invention.

Detailed description of the present invention will be described as follows.

A nickel hydroxide positive active material for an alkaline battery according to the present invention is mainly composed of nickel hydroxide powder having a nickel valence of greater than 2. A cobalt compound having a cobalt valence of greater than 2 is formed on the surface of the nickel hydroxide powder.

The average particle size of the nickel hydroxide powder in the present invention is in the range of 7 to 30 $\mu$m, preferably about 10 $\mu$m. The average particle size includes the thickness of the cobalt compound formed thereon.

A nickel hydroxide electrode according to the present invention is composed of a three-dimensional porous material retaining the above nickel hydroxide positive active material therein.

The nickel hydroxide powder according to the present invention is mainly composed of nickel hydroxide having a nickel valence of greater than 2. If the nickel valence of the nickel hydroxide powder exceeds 3, γ-nickel oxyhydroxide, which is considered to have an adverse effect on the charge-discharge cycle life of alkaline storage battery, is produced. Therefore, the nickel valence of nickel hydroxide to be used as a main component is preferably not more than 3.

The cobalt compound formed on the surface of the nickel hydroxide powder having a nickel valence of greater than 2 is preferably arranged covering the nickel hydroxide powder in a layer. If the cobalt valence of the cobalt compound is smaller than the nickel valence of the nickel hydroxide powder, the cobalt compound can be easily oxidized due to the strong oxidizing power of the nickel hydroxide powder, making it difficult to maintain its electrical conductivity. Therefore, the cobalt valence of the cobalt compound is preferably equal to or greater than the nickel valence of the nickel hydroxide powder. In other words, this cobalt compound is one of the materials responsible for the electrical conductivity of the nickel hydroxide powder which acts as an active material. Thus, this cobalt compound preferably has a high electrical conductivity. It is further preferred that the average nickel valence of the nickel hydroxide powder do not exceed the average cobalt valence of the cobalt compound having a cobalt valence of greater than 2 by which the nickel hydroxide powder is covered.

The foregoing three-dimensional porous material is preferably a three-dimensional porous metallic material such as foamed nickel and fibrous nickel.

Further, the nickel hydroxide electrode according to the present invention preferably is made of an admixture of a first nickel hydroxide powder having a nickel valence of not greater than 2 with a cobalt compound having a cobalt valence of greater than 2 formed on the surface thereof and a second nickel hydroxide powder having a nickel valence of greater than 2 with a cobalt compound having a cobalt valence of greater than 2 formed on the surface thereof, and a three-dimensional porous material retaining the admixture. In particular, the average nickel valence of the first and second nickel hydroxide powder of the admixture retained in the three-dimensional porous material is preferably not less than 2.07.

This is because the nickel hydroxide having a valence of greater than 2 exerts a reduced effect of enhancing the electrical conductivity when the average nickel valence of the entire nickel hydroxide active material containing the nickel hydroxide does not exceed 2.07.

In the nickel hydroxide electrode according to the present invention, the average nickel valence of the nickel hydroxide powder having a nickel valence of greater than 2 contained in the electrode preferably does not exceed the average cobalt valence of the cobalt compound having a cobalt valence of greater than 2 by which the nickel hydroxide powder is covered.

The nickel hydroxide active material which is a main component of the powder of the present invention has a nickel valence of greater than 2. Accordingly, the powder according to the present invention exhibits a higher electrical conductivity than the conventional nickel hydroxide powders. Further, since the cobalt compound layer having a cobalt valence of greater than 2 formed on the surface of the nickel hydroxide powder also exhibits a high electrical conductivity, the nickel hydroxide powder of the present invention can be used to prepare a nickel hydroxide electrode having a high electrical conductivity that can enhance the percent utilization of the nickel hydroxide electrode in an alkaline battery.

The nickel hydroxide active material for an alkaline battery according to the present invention can be used as a positive active material for an alkaline battery, particularly an alkaline storage battery. The nickel hydroxide powder for alkaline battery according to the present invention may be singly used as an active material. Alternatively, the nickel hydroxide powder for an alkaline battery according to the present invention may be used in admixture with an active material made of a powder mainly composed of nickel hydroxide as prepared by forming cobalt oxyhydroxide on the surface of particulate nickel hydroxide, having a cobalt compound having a cobalt valence of greater than 2 formed on the surface of the powder. The admixture may further contains other active materials or additives incorporated therein. Particularly, the nickel hydroxide powder is used in admixture with a nickel hydroxide powder having a nickel valence of not greater than 2 with a cobalt compound having a cobalt valence of greater than 2 formed on the surface thereof, it is easy to control the nickel valence in nickel hydroxide active material in the positive electrode.

Further, the active material of the present invention can be used as a starting material of electrode. Preferably, the active material of the present invention is retained on a three-dimensional porous support to prepare an electrode.

EXAMPLES

The present invention will be further described in the following examples and comparative examples.

Example 1

A nickel hydroxide powder was dispersed in purified water in an amount of three times that of the powder by weight. The aqueous dispersion was then adjusted to weak alkaline as pH 11 with a 23 wt-% aqueous solution of sodium hydroxide. To the aqueous dispersion was then added dropwise an aqueous solution of cobalt sulfate with stirring in an atmosphere of inert gas to prepare an nickel hydroxide active material made of a nickel hydroxide powder covered by 10 wt-% cobalt hydroxide on the surface thereof. Subsequently, the alkaline suspension containing the active material was withdrawn in the air. The alkaline suspension thus withdrawn was heated to a temperature of 80° C. with stirring for 3 hours, washed, and then dried to obtain nickel hydroxide covered by a cobalt compound having a valence of greater than 2. The sample was then subjected to chemical analysis. As a result, the cobalt compound coating layer was cobalt oxyhydroxide having a cobalt valence of 3.0. The nickel valence of the nickel hydroxide powder was 2.0.

330 g (nickel hydroxide content: about 3.24 mols) of the foregoing nickel hydroxide covered by cobalt oxyhydroxide was then dispersed in 5000 cc of a 5 wt-% aqueous solution of sodium hydroxide at room temperature. To the dispersion was then added 231 g (about 0.98 mols) of sodium peroxodisulfate as an oxidizer with stirring to cause reaction according to the following reaction formula (1). After 10 hours of stirring, the reaction product was washed and dried to obtain an active material powder A.

$$2Ni(OH)_2 + S_2O_8^{2-} + 2OH^- \rightarrow 2NiOOH + 2SO_4^{2-} + 2H_2O \qquad (1)$$

The active material powder A was then subjected to chemical analysis. As a result, the active material powder A was found to have a cobalt valence of 3.0 and a nickel valence of 2.5. The active material powder A was also subjected to X-ray diffractometry. As a result, the active material powder A was confirmed to show diffraction peaks corresponding to cobalt oxyhydroxide, nickel hydroxide and β-nickel oxyhydroxide.

100 parts by weight of the active material powder A thus obtained, 1 part by weight of carboxymethyl cellulose and purified water were then used to prepare a slurry sample. A foamed nickel substrate was impregnated with the slurry sample, pressed, and then dried to obtain a nickel hydroxide electrode A made of the active material powder A of the present invention.

As a negative electrode, there was used a known negative cadmium plate prepared by applying a slurry sample mainly composed of 70 parts by weight of a cadmium oxide powder and 30 parts by weight of a metallic cadmium powder to a punching metal, drying the punching metal, and then pressing the punching metal.

3 sheets of the positive electrode plates thus obtained, 4 sheets of the negative electrode plates thus obtained and a hydrophilically-treated polyolefin separator were then used to form an element. The element thus formed was inserted into a battery can filled with an electrolyte solution mainly composed of an aqueous solution of potassium hydroxide. To the battery can was then welded a cover having a safety valve incorporated therein to obtain a battery A of the present invention including the active material powder A of the present invention.

Comparative Example 1

100 parts by weight of nickel hydroxide covered by cobalt oxyhydroxide obtained as a precursor of the active material powder A of the present invention, 1 part by weight of carboxymethyl cellulose and purified water were used to prepare a slurry sample. A foamed nickel substrate was impregnated with the slurry sample, pressed, and then dried to prepare a nickel hydroxide electrode B. A comparative battery B was then obtained in the same manner as in Example 1 except that the nickel hydroxide electrode B thus prepared was used.

Comparative Example 2

200 g (about 2.16 mols) of a nickel hydroxide powder was dispersed in 2 l of a 5 wt-% aqueous solution of sodium hydroxide. To the dispersion was then added 309 g (about 1.30 mols) of sodium peroxodisulfate as an oxidizer with stirring to cause reaction according to the foregoing reaction formula (1). After 10 hours of stirring, the reaction product was washed and dried to obtain an active material powder C.

As a result of chemical analysis, the active material powder C thus obtained was found to have a nickel valence of 3.0. The results of X-ray diffractometry showed that the active material powder C composed of β-nickel oxyhydroxide.

The active material powder C thus obtained and a nickel hydroxide powder covered by 10 wt-% cobalt oxyhydroxide were then dry-mixed at a weight ratio of 45:50. 100 parts by weight of the mixture powder, 1 part by weight of carboxymethyl cellulose and purified water were used to prepare a slurry sample. A foamed nickel substrate was impregnated with the slurry sample, pressed, and then dried to obtain a nickel hydroxide electrode C composed of the active material powder C. A comparative battery C was then prepared in the same manner as in Example 1 except that the nickel hydroxide electrode C was used.

The positive electrodes of all these batteries have the theoretical capacity of 1,000 mAh. These batteries were prepared with the capacity of the negative electrode being excessive such that the positive electrode can act as a capacity-limiting electrode during both charging and discharging.

These batteries were each subjected to 10 cycles of 12 hour charging at 100 mA and discharging to 0.8 V at 100 mA at 25° C., and then measured the discharge capacity under the following conditions:

Charging . . . 120% (6 hours) at 200 mA

Discharging . . . To 0.8 V at 200 mA

Temperature . . . 25° C.

The results of test are shown in FIG. 1. The battery A of the present invention using an active material mainly composed of nickel hydroxide having a nickel valence of 2.5 covered by cobalt oxyhydroxide exhibited a discharge capacity as great as about 1,030 mAh. On the other hand, the comparative battery B using nickel hydroxide covered by cobalt oxyhydroxide and the comparative battery C using a nickel oxyhydroxide powder and a nickel hydroxide powder covered by cobalt oxyhydroxide exhibited a discharge capacity of about 980 mAh and about 1,000 mAh, respectively.

The batteries A and C using nickel oxyhydroxide incorporated in its positive electrode exhibited a higher discharge capacity than the comparative battery B, which is free of nickel oxyhydroxide. This is presumably attributed to the fact that the incorporation of nickel oxyhydroxide in the positive electrode causes the electrical conductivity of the active material itself to be raised, enhancing the percent utilization of the active material.

The reason why the battery A of the present invention, which uses an active material mainly composed of nickel hydroxide having a nickel valence of 2.5 covered by cobalt oxyhydroxide exhibits a greater discharge capacity than the comparative battery C, which uses nickel oxyhydroxide and nickel hydroxide covered by cobalt oxyhydroxide, is presumably because the battery A of the present invention uses a nickel hydroxide powder uniformly covered by cobalt oxyhydroxide, which can maintain its electrical conductivity even at the last stage of discharging.

The example has been described with reference to a nickel-cadmium storage battery having a cadmium electrode as a negative electrode. However, similar effects can be exerted also with other alkaline storage batteries using a zinc electrode or metal hydride electrode as a negative electrode.

The nickel hydroxide active material of the present invention can exert similar effects even when it contains at least one element selected from the group consisting of cobalt, manganese, zinc, cadmium and calcium solid-dissolved therein besides the single composition particles made of nickel compound alone.

Example 2

A nickel hydroxide powder was dispersed in purified water in an amount of about three times that of the powder by weight. 23-wt % potassium hydroxide was added to the dispersion to adjust its pH as 11. While this dispersion liquid was stirred, an aqueous solution of cobalt sulfate was dropped in an inert gas atmosphere. Then, nickel hydroxide active material was produced which the surface of nickel hydroxide powder was covered by 10 wt-% cobalt hydroxide with respect to nickel hydroxide. Then, the alkaline suspension containing the active material was withdrawn to the air, and was stirred for 3 hours at 80° C. Thereafter, it was washed, and then dried to obtain a nickel hydroxide powder covered by a cobalt compound having a cobalt valence of greater than 2. The sample thus obtained was then subjected to chemical analysis. As a result, the valence of the cobalt compound coating layer was found to be 3.0. The nickel hydroxide powder was found to have a valence of 2.0.

Subsequently, the nickel hydroxide powder covered by a cobalt compound having a valence of greater than 2 and a potassium peroxodisulfate powder were dispersed in an aqueous solution of 26 wt-% potassium hydroxide in an amount of about 20 times that of the nickel hydroxide powder covered by a cobalt compound having a valence of greater than 2 at a molar ratio of 2:1.4 to cause reaction according to the following reaction formula (1). The reaction solution was then stirred at room temperature for 10 hours. After reaction, the dispersion was filtered to obtain a black powder. The black powder thus obtained was washed with purified water until the pH value of the wash water reached 7, and then dried to obtain a nickel oxyhydroxide powder covered by a cobalt compound having a valence of greater than 2. The nickel oxyhydroxide powder thus obtained also was subjected to chemical analysis in the same manner as mentioned above. As a result, the nickel oxyhydroxide powder was found to have a nickel valence of 3.0 and a cobalt valence of 3.0. In the present example, the cobalt coating layer has exhibited a valence of 3 before oxidation. Therefore, it is thought that the cobalt coating layer didn't undergo oxidation by potassium peroxodisulfate.

$$2Ni(OH)_2 + S_2O_8^{2-} + 2OH^- \rightarrow 2NiOOH + 2SO_4^{2-} + 2H_2O \quad (1)$$

85 parts by weight of the foregoing nickel hydroxide powder covered by a cobalt compound having a valence of 3, 15 parts by weight of a nickel oxyhydroxide powder covered by a cobalt compound having a valence of 3 and 2 parts by weight of a carboxymethyl cellulose powder were then added to purified water to prepare a slurry sample. A foamed nickel substrate was impregnated with the slurry sample, pressed, and then dried to obtain a nickel hydroxide electrode D of the present invention. The nickel hydroxide electrode D thus obtained was then examined for average nickel valence. As a result, the nickel hydroxide electrode D was found to have an average nickel valence of 2.15.

As a negative electrode there was used an electrode prepared by applying a slurry sample mainly composed of a known AB5 type hydrogen-occluding alloy to punching metal, drying the coated material, and then pressing the punching metal.

3 sheets of the positive electrode plates thus obtained, 4 sheets of the negative electrode plates thus obtained and a hydrophilically-treated polyolefin separator were then used to form an element. The element thus formed was inserted into a battery can filled with an electrolyte solution mainly composed of an aqueous solution of potassium hydroxide. To the battery can was then welded a cover having a safety valve incorporated therein to obtain a battery D of the present invention.

Comparative Example 3

A nickel hydroxide powder was dispersed in purified water in an amount of about three times that of the powder by weight. 23 -wt% potassium hydroxide was added to the dispersion to adjust its pH as 11. While this dispersion liquid was stirred, an aqueous solution of cobalt sulfate was dropped in an inert gas atmosphere. Then, nickel hydroxide active material was produced which the surface of nickel hydroxide powder was covered with 11.3 wt-% cobalt hydroxide with respect to nickel hydroxide. Then, the alkalinene suspension containing the active material was withdrawn to the air, and was stirred for 3 hours at 80° C. Thereafter, it was washed, and then dried to obtain a nickel hydroxide powder covered by a cobalt compound having a cobalt valence of greater than 2. The sample thus obtained was then subjected to chemical analysis. As a result, the valence of the cobalt compound coating layer was found to be 3.0. The nickel hydroxide powder was found to have a valence of 2.0.

A nickel hydroxide electrode E was then prepared in the same manner as the nickel hydroxide electrode D of the foregoing example except that 88.5 parts by weight of the nickel hydroxide powder covered by a cobalt compound having a valence of greater than 2 and 11.5 parts by weight of a nickel oxyhydroxide powder were used. The nickel hydroxide electrode E was then used to obtain a comparative battery E. The nickel hydroxide electrode E thus obtained was then examined for average nickel valence. As a result, the nickel hydroxide electrode E was found to have an average nickel valence of 2.15.

Comparative Example 4

10 parts by weight of a cobalt hydroxide powder, 90 parts by weight of a nickel hydroxide powder and 2 parts by weight of a carboxymethyl cellulose powder were then added to purified water to prepare a slurry sample. A foamed nickel substrate was impregnated with the slurry sample, pressed, and then dried to obtain a nickel hydroxide electrode F. A comparative battery F was then prepared in the same manner as in the foregoing example except for the foregoing conditions. The nickel hydroxide electrode F thus obtained was then examined for average nickel valence. As a result, the nickel hydroxide electrode A was found to have an average nickel valence of 2.00.

All these batteries had a positive electrode having a theoretical capacity of 1,000 mAh.

These batteries were each subjected to 10 cycles of 12 hour charging at 100 mA and discharging to 0.8 V at 100 mA at room temperature so that the hydrogen-occluding alloy negative electrode was thoroughly activated, and then measured for discharge capacity under the following conditions:

Charging . . . 120% (6 hours) at 200 mA
Discharging . . . To 0.8 V at 200 mA
Temperature . . . 25° C.

Figure 2:
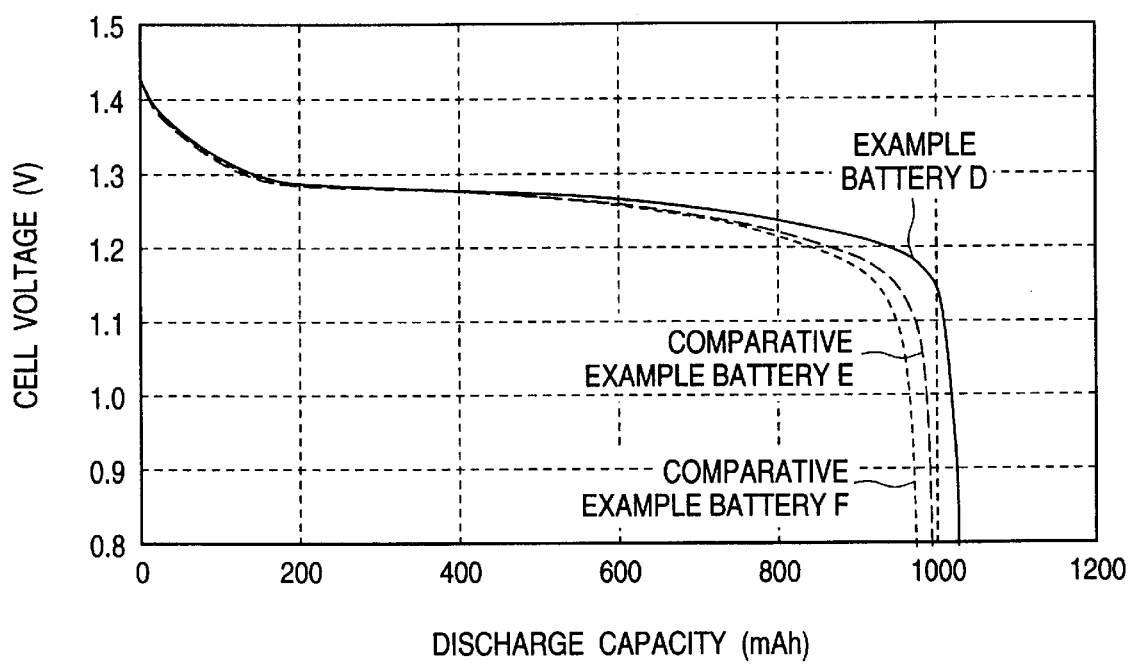
FIG. 2 is a graph illustrating the discharge characteristics of another embodiment of the nickel-metal hydride battery according to the present invention.

The results of test are shown in FIG. 2. The battery D of the present invention, which uses a nickel hydroxide powder covered by a cobalt compound having a valence of 2 and a nickel oxyhydroxide powder covered by a cobalt compound having a valence of greater than 2, exhibited a discharge capacity as great as about 1,030 mAh. On the other hand, the comparative battery E, which comprises a nickel hydroxide powder covered by a cobalt compound having a valence of greater than 2 and a nickel oxyhydroxide powder, and the comparative battery F, which uses a nickel hydroxide powder and a cobalt hydroxide powder, exhibited a discharge capacity of about 1,000 mAh and about 960 mAh, respectively.

The reason why the battery D of the present invention exhibits a greater discharge capacity than the comparative battery F is because the battery D of the present invention uses a nickel hydroxide powder and nickel oxyhydroxide powder covered by a cobalt oxyhydroxide having a high electrical conductivity, which exhibits a higher electrical conductivity than nickel hydroxide, present in the electrode plate. On the other hand, the comparative battery E uses cobalt hydroxide incorporated therein as a starting material of cobalt oxyhydroxide used as an electrically conducting agent merely in the form of powder. Further, the comparative battery F uses less electrically conducting agent (cobalt oxyhydroxide) which maintains its electrical conductivity at the last stage of discharging in the vicinity of the nickel oxyhydroxide powder incorporated therein. This is presumably why the comparative battery E exhibits a smaller discharge capacity than the battery of the present invention.

As mentioned above, the battery D of the present invention can maintain its high electrical conductivity at any stage during its charge-discharge process, making it possible to realize a high percent utilization of active material.

Even if a small amount of a hydroxide such as zinc, cobalt and cadmium is incorporated in a nickel hydroxide powder or a nickel hydroxide powder having a valence of greater than 2, the properties of the electrode of the present invention cannot be deteriorated. The oxidation of the nickel hydroxide powder for the production of a nickel hydroxide powder having a valence of greater than 2 or the production of a cobalt compound having a valence of greater than 2 can be accomplished chemically or electrochemically.

Further, cobalt oxyhydroxide which has previously been coated on the surface of an active material mainly composed of highly oxidized nickel hydroxide and an active material mainly composed of nickel hydroxide can be applied to a nickel hydroxide electrode prior to the preparation of alkaline storage battery to reduce the amount of an negative active material which cannot discharge electricity, making it possible to provide the alkaline storage battery with an enhanced energy density.

What is claimed is:

1. An electrode comprising:
   a positive active material comprising nickel hydroxide powder having a nickel valence of greater than 2, and
   a cobalt compound having a cobalt valence of greater than 2, wherein said cobalt compound is formed on the surface of said nickel hydroxide powder.

2. The electrode according to claim 1, wherein said positive active material comprising a first nickel hydroxide powder having a nickel valence of not greater than 2 with a cobalt compound having a cobalt valence of greater than 2 formed on the surface thereof and a second nickel hydroxide powder having a nickel valence of greater than 2 with a cobalt compound having a cobalt valence of greater than 2 formed on the surface thereof; and
   further wherein the average nickel valence of said first and second nickel hydroxide powder is not less than 2.07.

3. The electrode according to claim 1, wherein the average nickel valence of said nickel hydroxide powder is less than the average cobalt valence of said cobalt compound.

4. The electrode according to claim 1, wherein said three-dimensional porous material is a three-dimensional metal porous material.

* * * * *